United States Patent Office 3,207,498
Patented Sept. 21, 1965

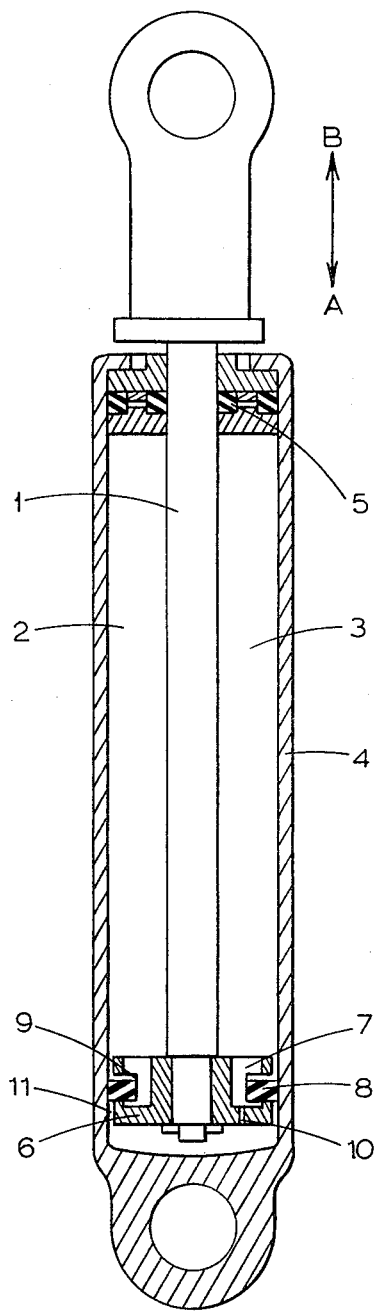

3,207,498
GAS SPRING
Ernst Wüstenhagen, Koblenz, Hans Peter Doetsch, Bayreuth, Gunter Otto, Koblenz-Moselweiss, and Wilfried Roos, Guls (Mosel), Germany, assignors to Stabilus Industrie- und Handelsgesellschaft m.b.H., Herbesichstrasse, Koblenz-Neuendorn, Germany
Filed July 19, 1963, Ser. No. 296,408
Claims priority, application Germany, July 19, 1962,
St 19,501
4 Claims. (Cl. 267—65)

The invention relates to gas springs or dampers.

Springs used hitherto have almost exclusively been steel springs, rubber springs and in isolated cases, for example for vehicle suspensions, air springs.

The disadvantages with such springs are, inter alia, their unfavourable overall size, because the dimensions of conventional springs depend on the permissible torsional and shearing stresses i.e. large forces require a large amount of spring material. With steel springs, a small spring constant $c$ can be obtained only with large overall spring lengths, so that in most cases one has to be satisfied with a compromise. In the case of rubber, $c$ is always very large, and with previously proposed gas springs it is again impossible to keep $c$ very small. In addition, with none of the above-mentioned springs can there be damping without special additional outlay.

The invention therefore aims to avoid these disadvantages and to provide a gas spring having forces which increase only gradually in relation to the spring deflection and where the ratio of starting pressure to final pressure has no effect on the overall length. Accordingly, it is an aim of the invention to provide a gas spring having the following features:

(a) A substantially horizontal characteristic curve,
(b) A high-pressure gaseous filling medium,
(c) Variable damping even for the smallest spring deflections.

The word "variable" is intended to denote firstly that damping may differ in the two directions of movement, and secondly that the construction is such that it is easy to produce different degrees of damping within very wide limits depending on the intended use of the gas spring.

There is thus provided, according to the invention, a gas spring which comprises a cylinder closed at one end and having an aperture in the other end; a piston slidably mounted in said cylinder; valve means permitting gas flow across said piston, the minimum cross-sectional area of the gas path through the valve means being different for each of the two directions of gas flow induced by movement of the piston; a piston rod attached to the piston and extending through said aperture in the cylinder; and a seal slidable on said piston rod and arranged to prevent the escape of gas through said aperture, the piston rod being such that the volume of the gas in the cylinder with the rod fully retracted is not greater than twice the volume of the gas in the cylinder with the rod fully extended, the arithmetic mean of the gas pressures in the said two positions of the piston rod being greater than 70 atmospheres absolute.

It is preferred that the ratio of the volume of the gas with the rod fully retracted to the volume of the gas with the rod fully extended into the cylinder is less than 1.4:1.

An example of the invention will be described with reference to the accompanying drawing, which illustrates a gas spring in cross-section.

In the chosen example, the displacement element comprises a piston rod 1 acting as a plunger which is reciprocable in the working space 3 of a tubular container 4, the working space 3 being filled with a high pressure gaseous medium 2. The medium 2 is preferably an inert gas, for example nitrogen.

Strong forces are obtainable with the aid of a high gas pressure in conjunction with a displacement element. These forces depend on the pressure of the filling gas and the effective area of the displacement, i.e. the cross-sectional area of the plunger 1 in the case in question. By using a displacement piston rod of the plunger type the sealing ratio and thus the spring constant $c$ can be kept very low. The length of the gas spring is determined solely by the desired stroke.

Since the starting pressure and final pressure are governed only by the ratio of the diameter of the container to that of the displacement piston, these pressures have no effect on the overall length. That is to say, the length is completely independent of the applied or output force.

The high pressure of the gas calls for relatively good gas tightness. This makes it possible to use damping members with nozzles or the like, of dimensions which are economic to produce. Thus, the use of a substantially tightly sealed damping piston in the presence of a high gas pressure makes damping effective very rapidly by way of an immediate sharp rise in pressure, even if the movements are small.

The plunger 1 passes into the working space 3 through a high-pressure seal 5 which is shown diagrammatically. The lower end of the plunger 1 carries a damping member comprising a piston 6 having damping means, such as holes 7, which are open on both sides or may be covered on one side in known manner by means of valve plates.

A further advantageous feature of the damping member consists in mounting a piston ring 8 for axial movement in an annular groove 9 of the piston 6, the arrangement being such that it blocks the path of flow through the gap 11 (as illustrated) when the piston moves in the direction B but, when the piston moves in the direction A, it permits flow through the gap 11 and holes 7 which may terminate in damping nozzles. On movement in the direction B, the piston ring 8 is applied to the side of the groove 9 opposite to the direction of movement, and the pressure in the spaces in front of and behind the piston 6 can be equalised only through the holes 7 via the bleed passage 10. Thus, the movement is damped. When the piston moves in the direction A, however, the piston ring 8 is applied to the other side of the annular groove 9. In this case, the pressure is equalised through the holes 7 via the gap 11 between the piston 6 and the inner wall of the container 4 as well as via the bleed passage 10. As the flow cross-section is now greater than with piston movement in the direction B, there is less damping.

Turning the piston 6 the other way round of course produces a change in the direction of greater damping. Damping can be controlled within wide limits by suitably dimensioning the cross-sections of the holes and nozzles, and an optimum design for the gas spring can be obtained if the two values "high gas pressure" and "effective area" are taken into account.

Amongst the many advantages of using gas springs according to the invention is the important consideration that the springs are simple to mass-produce.

We claim:

1. A gas spring which comprises a cylinder closed at one end and having an aperture in the other end; a piston slidably mounted in said cylinder; valve means permitting gas flow across said piston, the minimum cross-sectional area of the gas path through the valve means being different for each of the two directions of gas flow induced by movement of the piston; a piston rod attached to the piston and extending through said aperture in the cylinder; and a seal slidable on said piston rod and arranged to prevent the escape of gas through said aperture, the piston rod being such that the volume of the gas in the cylinder with the rod fully retracted out of the cylinder is not greater than twice the volume of the gas in the cylinder with the rod fully extended into the cylinder, the arithmetic means of the gas pressures in the said two positions of the piston rod being greater than 70 atmospheres absolute.

2. A gas spring according to claim 1, wherein the gas is an inert gas.

3. A gas spring according to claim 2, wherein the inert gas is nitrogen.

4. A gas spring, as claimed in claim 1, wherein the ratio of the volume of the gas with the piston rod fully retracted out of the cylinder to the volume of the gas with the piston rod fully extended into the cylinder is less than 1.4:1.

References Cited by the Examiner

UNITED STATES PATENTS

| 1,767,105 | 6/30 | Wallace | 267—64 |
| 2,363,485 | 11/44 | Down | 267—64 |
| 2,476,228 | 7/49 | Thornhill | 267—64 |
| 2,774,446 | 12/56 | Bourcier de Carbon | 267—64 |
| 2,823,915 | 2/58 | Bourcier de Carbon | 267—64 |
| 2,992,816 | 7/61 | Gail | 267—64 |

FOREIGN PATENTS

| 531,168 | 12/40 | Great Britain. |
| 1,127,486 | 12/56 | France. |

ARTHUR L. LA POINT, *Primary Examiner.*

EUGENE A. BOTZ, *Examiner.*